UNITED STATES PATENT OFFICE.

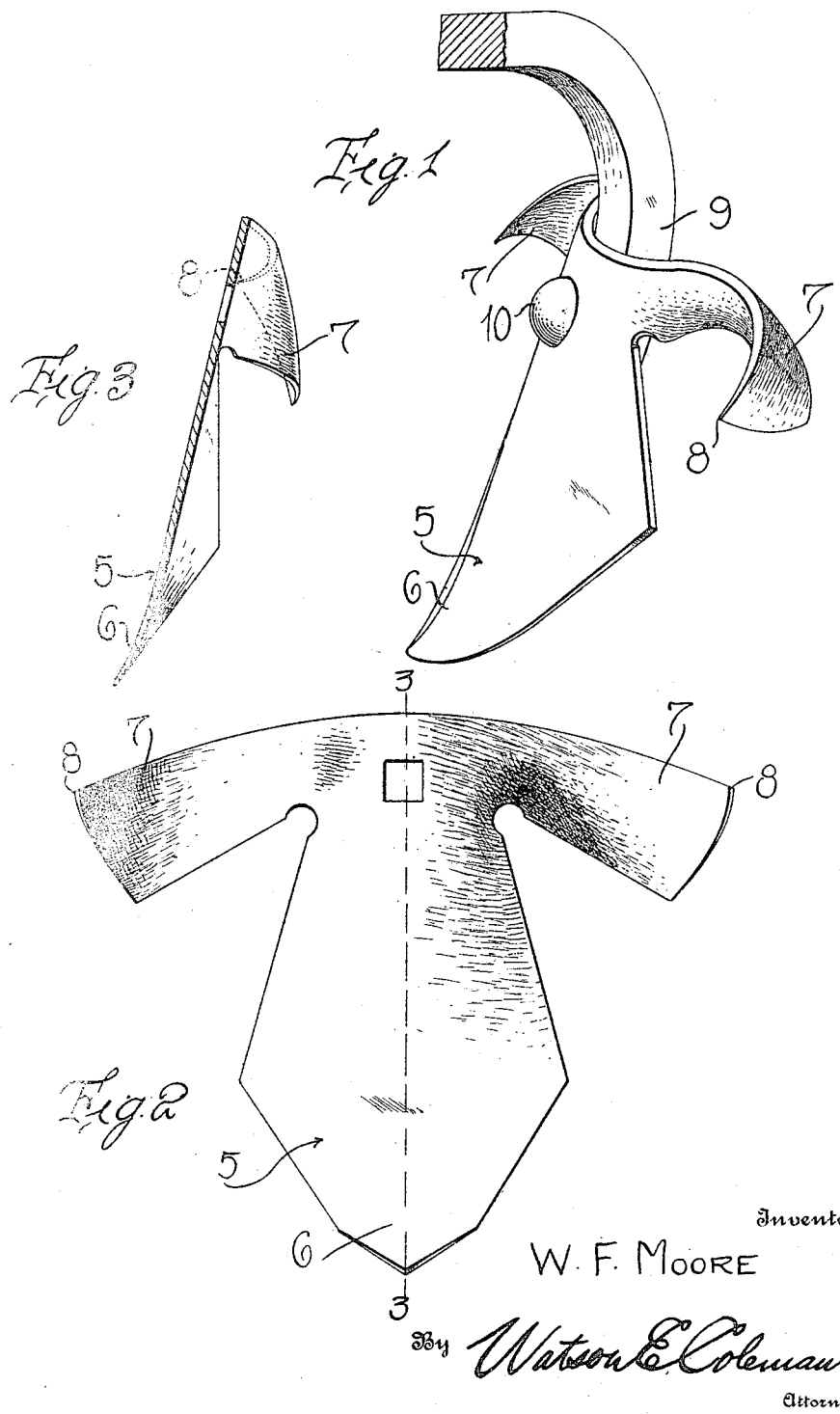

WILLIAM F. MOORE, OF VOTAW, TEXAS.

PLOW.

1,210,350.   Specification of Letters Patent.   Patented Dec. 26, 1916.

Application filed May 4, 1916. Serial No. 95,412.

*To all whom it may concern:*

Be it known that I, WILLIAM F. MOORE, a citizen of the United States, residing at Votaw, in the county of Hardin and State of Texas, have invented certain new and useful Improvements in Plows, of which the following is a specification, reference being had to the accompanying drawings.

This invention relates to an improved plow and has for its primary object to provide a plow of that type commonly known as a wing plow wherein the plow blade is provided at its upper end with laterally projecting wings for the purpose of deflecting and directing the soil.

It is the primary object of the present invention to provide a plow of the above character which may be used for either deep or shallow plowing, and wherein the wings are so formed as to direct the soil in a forward direction into an adjacent furrow.

It is another object of the invention to provide a plow which may be advantageously employed for the cultivation of young plants, and which will prevent the soil being thrown upon and injuring the plants.

It is a further general object of the invention to devise an improved form of wing plow which may be produced in the form of a single casting and may, therefore, be cheaply manufactured and which is also highly efficient and serviceable in practical use.

With the above and other objects in view, my invention consists in the novel features of construction, combination and arrangement of parts to be hereinafter more fully described, claimed and illustrated in the accompanying drawing, in which, Figure 1 is a perspective view of my improved plow; Fig. 2 is a top plan view thereof; and Fig. 3 is a section taken on the line 3—3 of Fig. 2.

Referring in detail to the drawing, 5 designates the plow blade which is of substantially diamond-shape form in plan, and at the forward end of the blade the longitudinal edges thereof are gradually curved in convergent relation to a meeting point. The body portion of the blade 5 is transversely curved, as clearly shown in Fig. 3, the upper convex surface of the plow blade gradually sloping from the central ridge thereof to its inclined longitudinal edges.

The blade 5 is provided upon its upper end with the laterally projecting wings 7. These wings are relatively narrow at their juncture with the plow blade and gradually increase in width to their outer ends. Each of the blades 7 is longitudinally and transversely curved to define a portion of a spiral, and the upper corners or points 8 of these wings project forwardly or toward the point of the plow blade. It is also to be observed that the wings 7 are disposed on a slight downward incline and that the upper marginal portions of said wings at no point extend above the top of the blade 5.

9 designates a standard for the plow, and the upper end of the plow blade 5 is formed with a suitable opening to receive the fastening bolt 10 secured in the lower end of the standard. It will, however, be understood that any desired means may be employed for the purpose of mounting my improved plow upon the standard. The plow may also be employed in cultivating machines in lieu of the ordinary shovels.

In the practical use of the invention, it will be understood that as the plow is drawn, the point 6 thereof penetrates the soil and cuts its way through the same, forming the furrow. The soil rides upwardly over the convex surface of the blade and upon the concave faces of the laterally projecting wings 7. These wings direct the accumulating soil in a forward direction and inwardly close to the sides of the plow blade 5. Thus, the furrow, as it is formed, remains clear of the soil thrown up by the plow, and one of the blades 7 will direct the soil into the previously formed furrow on one side of the plow. In the cultivation of young plants, the plow is drawn between the plant rows, and the wings 7 prevent the soil from being thrown over upon the plants and injuring the same, but direct such soil in a forward direction around the base of the plant stalks. By constructing the plow blade 5 in the form shown, the point thereof will easily penetrate the hard top soil of unplowed ground, and the draft upon the animals connected to the plow is materially lessened. If desired, the plow may be used in connection with a gage wheel or other suitable means for determining the depth of the furrow, as will be readily understood.

From the foregoing description, taken in connection with the accompanying drawing, the construction, manner of operation and several advantages of the invention will be clearly and fully understood. The device is exceedingly simple and very desirable and efficient in practical use. The plows can, of course, be made in various sizes to suit the particular use for which the same may be employed.

While I have shown and described the preferred form of the several structural features of the device, it is, of course, to be understood that the same are susceptible of considerable modification therein and I, therefore, reserve the privilege of adopting all such legitimate changes as may be fairly embodied within the spirit and scope of the invention as claimed.

Having thus fully described my invention, what I desire to claim and secure by Letters Patent is:—

As an improved article of manufacture, a plow including a blade transversely curved to provide a convex upper surface, and wings projecting laterally and downwardly in opposite directions from the upper longitudinal edges of the blade and gradually increasing in width from their inner to their outer ends, said wings being spirally curved and having the upper portions of their outer ends projecting forwardly toward the point of the blade.

In testimony whereof I hereunto affix my signature in the presence of two witnesses.

WILLIAM F. MOORE.

Witnesses:
D. L. WILLIAMS,
W. H. KELLEY.

Copies of this patent may be obtained for five cents each, by addressing the "Commissioner of Patents, Washington, D. C."